United States Patent [19]

Tarcy et al.

[11] Patent Number: 4,808,498

[45] Date of Patent: Feb. 28, 1989

[54] ALUMINUM ALLOY AND ASSOCIATED ANODE

[75] Inventors: Gary P. Tarcy, Plum Borough; Robert M. Mazgaj, Lower Burrell, both of Pa.

[73] Assignee: Aluminum Company of America, Pittsburgh, Pa.

[21] Appl. No.: 136,007

[22] Filed: Dec. 21, 1987

[51] Int. Cl.$^4$ ................ H01M 4/46; C22C 21/00
[52] U.S. Cl. ................ 429/218; 204/197; 204/293; 252/182.1; 420/554
[58] Field of Search ........... 420/554; 204/148, 197, 204/293; 429/27, 218; 252/182.1

[56] References Cited

U.S. PATENT DOCUMENTS

| | | | |
|---|---|---|---|
| 3,180,728 | 4/1965 | Pryor et al. | 420/528 |
| 3,186,836 | 6/1965 | Pryor et al. | 420/548 |
| 3,189,486 | 6/1965 | Pryor et al. | 429/199 |
| 3,240,688 | 3/1966 | Pryor et al. | 204/148 |
| 3,282,688 | 11/1966 | Pryor et al. | 420/548 |
| 3,337,332 | 8/1967 | Reding et al. | 420/554 |
| 3,368,952 | 2/1968 | Pryor et al. | 204/148 |
| 3,379,636 | 4/1968 | Reding et al. | 204/293 |
| 3,616,420 | 10/1971 | Broughton | 204/197 |
| 3,878,081 | 4/1975 | Reding et al. | 204/197 |
| 4,084,963 | 4/1978 | Anthony et al. | 420/554 |
| 4,098,606 | 7/1978 | Despic et al. | 420/528 |
| 4,196,262 | 4/1980 | Pryor et al. | 428/654 |
| 4,288,500 | 9/1981 | Jovanovic et al. | 428/650 |

FOREIGN PATENT DOCUMENTS

| | | | |
|---|---|---|---|
| 209402 | 1/1987 | European Pat. Off. | |
| 21173 | 7/1970 | Japan | 420/554 |

OTHER PUBLICATIONS

Hori et al., Aluminum Alloys for Aluminum Primary Cell, Electrochimica vol. 30, No. 9, pp. 1121–1124 (1985).

*Primary Examiner*—L. Dewayne Rutledge
*Assistant Examiner*—Robert L. McDowell
*Attorney, Agent, or Firm*—Douglas G. Glantz; Arnold B. Silverman

[57] ABSTRACT

An aluminum alloy contains at least about 0.01 to 0.2 weight percent gallium, at least about 0.01 to 0.2 weight percent tin, and at least about 0.01 to 0.2 weight percent lead. In another embodiment, the alloy may contain at least about 0.01 to 0.2 weight percent indium in lieu of the tin. The balance of both alloys is aluminum, tolerable levels of trace metals, and impurities. Preferably, the aluminum is present in 99.9% purity. The alloy can be used advantageously as an anode in an aluminum-air battery. The gallium-tin-lead aluminum alloy when used as an anode, is preferably used with a salt water electrolyte. The gallium-indium-lead alloy, when used as an anode is preferably used with a caustic electrolyte. The aluminum base alloy may be used as an anode in a battery assembly, a housing, an anode of the present invention, a cathode, and a support means within the housing to secure the anode and cathode in a relative spaced relationship.

15 Claims, No Drawings

ALUMINUM ALLOY AND ASSOCIATED ANODE

BACKGROUND OF THE INVENTION

1. Field of the Invention

This invention relates to an aluminum alloy, and more specifically to an alloy adapted for use in an anode.

2. Description of the Prior Art

The use of aluminum alloys in mechanically rechargeable batteries is well known. Aluminum is a preferred battery anode because of its high energy content and low cost. However, problems with voltaic efficiency from use in protic solvents and coulombic inefficiency have prevented wide commercial use of these aluminum anodes.

Hori et al in "Aluminum Alloys For Aluminum Primary Cell", *Electrochemical Acta* V. 30(9): 1121–1124 (1985) discloses a preferred aluminum based alloy containing 3.0 percent zinc; 0.13 percent tin; 0.01 percent gallium; and 0.07 percent bismuth.

U.S. Pat. No. 4,196,262 discloses an aluminum alloy which contains 4 to 14 percent silicon and 0.01 to 2 percent indium and/or gallium.

Various prior art references have disclosed aluminum alloys having gallium and/or indium. See, for example, U.S. Pat. Nos. 3,240,688; 3,379,636; 3,616,420; 3,878,081; 4,098,606; and 4,288,500 and European patent application No. 209,402.

Aluminum alloys also have been known to contain tin. See, for example, U.S. Pat. Nos. 3,368,952; 3,282,688; 3,240,688; 3,189,486; 3,186,836; and 3,180,728.

In spite of these prior disclosures, there remains a need for an alloy that provides improved open circuit voltage, improved coulombic efficiency and low parasitic corrosion.

SUMMARY OF THE PRESENT INVENTION

The present invention has met the above-described need by providing an aluminum alloy which comprises at least about 0.01 to 0.2 percent gallium, at least about 0.01 to 0.2 percent lead, and at least about 0.01 to 0.2 percent tin. This alloy, when used as an anode, is preferably used with a salt water electrolyte. Optionally, indium may be substituted in the above-described alloy in the amount of at least about 0.01 to 0.2 weight percent in lieu of the tin. This alloy, when used as an anode, is preferably used with a caustic electrolyte. Preferably, the purity of the aluminum is at least about 99.9 percent.

It is another object of this invention to provide an improved aluminum alloy which can be used as an anode in a battery cell.

It is an object of this invention to provide an aluminum alloy having improved voltage characteristics when used as an anode in a battery cell.

It is an object of this invention to provide an aluminum alloy exhibiting reduced corrosion when used as an anode in a battery cell.

It is an object of this invention to provide an aluminum alloy with improved open circuit potential.

It is a further object of this invention to provide an aluminum alloy with improved coulombic efficiency.

It is an object of this invention to provide an aluminum alloy with aluminum purity being at least about 99.99 percent.

It is an object of this invention to provide an aluminum alloy using relatively low levels of gallium, lead, and tin.

It is an object of this invention to provide an aluminum alloy using relatively low levels of gallium, lead, and indium.

These and other objects of the present invention will be more fully understood from the following description of the invention.

DESCRIPTION OF THE PREFERRED EMBODIMENT

Unless expressly indicated to the contrary in a particular usage herein, all references to percentages are references to weight percent.

While, in general, it is contemplated that the present invention will be used primarily as an alloy for anodes in, for example, aluminum-air batteries, it may also be used for other purposes. The invention may be employed in emergency back-up applications, such as emergency lighting, for example. The alloy may also be used as a sacrificial electrode for cathodic protection.

The preferred use of the aluminum alloy as an anode contemplates use in an aluminum-air battery with a caustic electrolyte being preferred in the case of the gallium-lead-indium aluminum alloy embodiments and with saline electrolyte in the case of the gallium-lead-tin alloy embodiments.

The alloy may be preferably used as an anode in a battery. The battery preferably has a housing, an anode of the present invention disposed within the housing, a cathode disposed within the housing, and support means disposed within the housing which secures the anode and cathode in a relatively spaced relationship.

It is preferred that at least about 0.01 to 0.2 percent gallium, at least about 0.01 to 0.2 percent tin, and at least about 0.01 to 0.20 percent lead be present in the aluminum alloy anode for use with saline. The caustic electrolyte aluminum alloy preferably contains at least about 0.01 to 0.2 percent gallium, at least about 0.01 to 0.2 percent indium, and at least about 0.01 to 0.20 percent lead.

Gallium has a low melting temperature and expands upon solidifying. In the alloys of the present invention, gallium serves to facilitate achieving increased voltage. Gallium is present in the alloy in amounts of at least about 0.01 to 0.2 percent, and more preferably, is present in an amount of 0.05 to 0.15 percent.

Lead is characterized by softness, pliability, a low melting temperature, and atmospheric and chemical corrosion resistance. Alloys containing lead are particularly preferred in the battery arts due to their superior corrosion resistance. While lead increases coulombic efficiency, the presence of lead tends to decrease voltage. In the alloy of the present invention, the presence of lead increases coulombic efficiency while maintaining the desired voltage. Lead is preferably present in the alloy in amounts of at least about 0.01 to 2 percent and more preferably present in an amount of 0.01 to 0.1 percent.

The presence of tin in the alloy generally improves voltage without detrimentally affecting the coulombic efficiency. Tin is present in the alloy in amounts of at least about 0.01 to 2 percent and more preferably present in an amount of 0.05 to 0.2 percent.

In a second embodiment of the invention, indium is used in lieu of tin in the alloy in an amount of at least about 0.01 to 0.2 percent and more preferably 0.05 to 0.2 percent. Indium is a soft and malleable metallic element which has a low melting point. Indium provides the characteristics of increased voltage without decreasing the coulombic efficiency of an alloy.

The gallium-lead-tin alloy is preferably used as an anode in a salt water electrolyte. The salt solution may be of varying concentrations known to those skilled in the art such as 4 molar solution, for example, and may be comprised of any suitable salt, such as sodium chloride, potassium chloride, potassium bromide, and potassium iodide, for example.

Aluminum, lead and the other alloy metals sometimes contain trace metals or impurities, such as heavy transition elements, for example, iron, copper, and nickel, for example. These elements tend to be catalytic towards water reduction. These cathodic sites on the anode tend to produce local reduction of water. It is preferred that the alloying elements be of high purity to minimize the presence of detrimental effects. Aluminum with a purity of at least about 99.9 percent provides superior characteristics for the alloy.

The alloys of the present invention may be alloyed by melting aluminum of desired purity at about 1300° F. to 1400° F. in a graphite crucible lined with a material which resists contamination from the crucible. The alloying elements may be added slowly in any desired sequence. The molten alloy is stirred for preferably at least about an hour, until the mixture is homogeneous. The molten mixture is then poured into a mold.

The alloy may be used as cast. It is preferred that the ingot be heated to about 500° C. to 660° C. for about four hours and cold water quenched in order to homogenize and solubilize the alloy. Additionally, the alloy may be cold rolled into the desired shape.

Heat treatments serve to homogenize the lead, gallium, indium, or tin in the alloy and to decrease the collection of impurities at the grain boundaries.

ALUMINUM-LEAD-TIN ALLOY

Example 1

A suitable specific alloy of the present invention has the following composition:

| | |
|---|---|
| gallium | about 0.1 percent |
| lead | about 0.1 percent |
| tin | about 0.1 percent |
| balance 99.999 percent pure aluminum and tolerated impurities. | |

The open circuit potential of above alloy was measured in a 20 percent KCl solution against a saturated calomel electrode (SCE). The electrode was then anodically polarized to a current density of 300 ma/cm$^2$.

Table 1 shows open circuit potential before and after polarization when compared with 99.999 percent aluminum.

TABLE 1

| | Open Circuit Potential (OCP) | Polarized At 300 ma/cm$^2$ |
|---|---|---|
| Alloy 1 vs. SCE | −1.733 Volts | −1.2 Volts |
| 99.999% Al vs. SCE | −1.2 Volts | −0.75 Volts |

The results show that Alloy 1 shows significantly improved voltage as compared with 99.999 percent aluminum.

After polarization, Alloy 1 was immersed in an aerated 20 percent KCl solution for about 242 days. An aluminum alloy containing 3.0 percent zinc, 0.13 percent tin; 0.01 percent gallium, and 0.07 percent bismuth as disclosed in Hori et al was also tested. The weights of the alloys were measured before and after immersion in the 20 percent KCl solution and the corrosion rate was calculated using Faraday's law. The following chart shows the corrosion rate of Alloy 1 when compared to the Hori et al alloy.

TABLE 2

| | Corrosion Rate (mg/cm$^2$) |
|---|---|
| Alloy 1 (Ga, Pb, Sn) | 0.0015 |
| Hori et al alloy | 0.09 |

As shown by Table 2, the corrosion rate of Alloy 1 of the present invention provides significant corrosion resistance which shows significantly less corrosion than the prior art Hori et al. The open circuit corrosion is significantly reduced, resulting in significantly increased shelf life.

The potential and corrosion rate of various alloys of the present invention were tested using 99.999 percent aluminum as the base aluminum. Specific percentages for the Ga-Pb-Sn alloys were tested in an electrolyte of 20 percent by weight KCl at room temperature. The alloys were made by weighing the appropriate amounts of appropriate elements and adding them to 99.999 percent molten aluminum. The molten metal was mixed and then an ingot of these alloys cast in a book mold. Samples were cut from the center of the ingot to assure a homogeneous mixture and machined into cylinders approximately 3 cm long and 0.564 cm in diameter. The cylinders were then placed into an electrode holder so that 1 cm of the length and the end face of the cylinder were exposed to the electrolyte.

The open circuit potential (E open Volts) was measured against a Saturated Calomel Electrode (SCE). The aluminum alloys were allowed to stand at open circuit for approximately 5 minutes and then an anodic current of 20 ma/cm$^2$ was applied to the aluminum alloy electrode. The counter electrode was a large platinum foil. The voltage was again recorded (E 20 ma/cm$^2$ Volts).

Voltage readings were taken approximately every minute for 1 hour and the average voltage and standard deviation were recorded in Table 3 of Example 2.

Example 2

Table 3 shows how the open circuit potential, the potential at 20 ma/cm$^2$ and the parasitic corrosion rate for composition variation of some gallium-lead-tin alloys. The best alloy is characterized by the most negative potential under polarized conditions and by the least parasitic corrosion.

TABLE 3

| Alloy Weight Percent | E vs SCE Open Circuit (Volts) | E vs SCE At 20 ma/cm$^2$ (Volts) | Icorr By H$_2$ ma/cm$^2$ | Icorr By Q ma/cm$^2$ |
|---|---|---|---|---|
| .01 Ga, .01 Pb, .01 Sn | −1.053 | −0.794 ± .005 | 2.13 | 4.33 |
| .2 Ga, .01 Pb, .01 Sn | −1.537 | −1.382 ± .003 | 3.63 | 3.99 |
| .01 Ga, .2 Pb, .01 Sn | −1.120 | −0.768 ± .002 | 2.37 | 0 |
| .01 Ga, .2 Pb, .01 Sn | −1.153 | −0.776 ± .002 | 2.50 | 3.49 |
| .01 Ga, .01 Pb, .2 Sn | −1.605 | −1.449 ± .007 | 6.09 | 6.89 |

TABLE 3-continued

| Alloy Weight Percent | E vs SCE Open Circuit (Volts) | E vs SCE At 20 ma/cm² (Volts) | Icorr By H₂ ma/cm² | Icorr By Q ma/cm² |
|---|---|---|---|---|
| .2 Ga, .2 Pb, .01 Sn | −1.501 | −1.269 ± .007 | 4.66 | 5.68 |
| .2 Ga, .01 Pb, .2 Sn | −1.665 | −1.515 ± .003 | 6.00 | 9.90 |
| .01 Ga, .2 Pb, .2 Sn | −1.583 | −1.452 ± .004 | 3.72 | 4.84 |
| .2 Ga, .2 Pb, .2 Sn | −1.501 | −1.528 ± .003 | 5.76 | 4.64 |

E vs SCE is the voltage of the alloy vs saturated colomel electrode at either open circuit or at 20 ma/cm² applied current. Icorr H₂ is the parasitic corrosion current measured by collecting H₂ evolved from the aluminum alloy. Icorr Q₂ is the parasitic corrosion current calculated by Faraday's law.

Examination of Table 3 shows no significant increase in the parasitic corrosion rate of this high voltage alloy compared to the other alloys.

In Table 4 of Example 3, the alloy was polarized at 332.4 ma/cm² instead of 20 ma/cm². Corrosion currents were measured (1) by the difference in the weight loss of the alloy sample compared to the expected weight loss calculated from Faraday's law and (2) by measuring the amount of hydrogen evolved from the aluminum alloy.

Faraday's law gives the theoretical minimum weight loss from an aluminum alloy which is anodically polarized using the equation:

$$(c/96,500) \times (26.9815/3) = WL$$

wherein c is coulombs and WL is the theoretical weight loss.
As a result, any extra weight loss can be attributed to a parasitic corrosion reaction such as $$Al + 3H_2O \rightarrow Al(OH)_3 + 3/2 H_2$$

The corrosion rate can then be calculated (in terms of a corrosion current) by the following equation.

$$(EWL/26.9815) \times (96,500/3)]/(T)(SA) = PCR$$

wherein EWL is the extra weight loss; T is time; SA is the total surface area of the aluminum exposed to the electrolyte; and PCR is the parasitic corrosion rate.

Example 3

In this example, 331.4 ma/cm² was applied to the following 99.99 percent aluminum alloys in 20 percent KCl.

TABLE 4

| Alloy Weight Percent | OCP (Volts) | At I Applied (Volts) |
|---|---|---|
| 0.1 Ga, 0.1 Pb, 0.1 Sn | −1.607 | −0.950 |
| | −1.651 | |
| 0.1 Ga, 0.1 Pb, 0.1 Sn | −1.733 | −1.024 |
| 0.1 Ga, 0.1 Pb, 0.1 Sn | −1.639 | −1.367 |
| 0.1 Ga, 0.1 Pb, 0.1 Sn | −1.593 | −1.353 |
| 0.1 Ga, 0.1 Pb, 0.1 Sn | −1.390 | −0.867 |

Table 4 shows that acceptable voltages are obtained on these alloys even at large current densities which would normally passivate the alloy.

Example 4

The following alloys were immersed in a 20 percent KCL solution for 257 days.

TABLE 5

| Alloy Weight Percent | Parasitic Corrosion ma/cm² | Open Circuit Potential 0 Min. (Volts) |
|---|---|---|
| .01 Ga, .01 Pb, .01 Sn | 0.053 | 0.868 |
| .2 Ga, .01 Pb, .01 Sn | 0+ | 1.06 |
| .01 Ga, .2 Pb, .01 Sn | 0.209 | 0.904 |
| .01 Ga, .01 Pb, .2 Sn | 1.020 | 1.071 |
| .2 Ga, .2 Pb, .01 Sn | 0+ | 1.344 |
| .2 Ga, .01 Pb, .2 Sn | 0.720 | 1.448 |
| .01 Ga, .2 Pb, .2 Sn | 0.868 | 1.170 |
| .2 Ga, .2 Pb, .2 Sn | 0.178 | 0.682 |

Table 5 shows the rate of parasitic corrosion of the alloys soaked in a 20 percent KCl solution for an extended period of time, as would be experienced by the alloys in a battery environment. The data show a small, but acceptable corrosion rate for these tested alloys. It should be noted that the best alloy in terms of polarization behaviour as shown in Example 2 and Table 3 (0.2 Ga, 0.2 Pb, and 0.2 Sn) is also one of the best in terms of open circuit corrosion rate.

ALUMINUM-GALLIUM-INDIUM-LEAD ALLOY (Alloy 2)

Example 5

A suitable specific alloy of the present invention may have the following composition:

| | |
|---|---|
| gallium | about 0.1 percent |
| indium | about 0.1 percent |
| lead | about 0.1 percent |
| balance 99.999 percent pure aluminum | |

The parasitic corrosion rate at open circuit and at an applied current of 200 ma/cm² of Alloy 2 was tested with 99.999 percent aluminum. The open circuit potential and voltage were also compared.

TABLE 6

| | Parasitic Corrosion Rate ma/cm² At Open Circuit | Parastic Corrosion Rate ma/cm² At Applied Current of 200 ma/cm² | Open Circuit Potential Versus Hg/HgO | Voltage At 200 ma/cm² Anodic Current Versus Hg/HgO |
|---|---|---|---|---|
| 99.999% Al | 80 ma/cm² | .169 ma/cm² | −1.76 | −0.82 |
| Alloy 2 | 2.2 | 4.4 | −1.672 | −1.52 |

Table 6 shows improved corrosion resistance and more negative operating voltages as compared with 99.999 percent aluminum as shown by the significantly lower numbers of the corrosion rate of alloy 2. The voltage numbers show improved voltage when compared to 99.999 percent aluminum.

Example 6

A three neck 2000 ml round-bottom flask with an additional fourth port was used to hold the electrolyte. The electrolyte used was 6M sodium hydroxide. One port on the flask was used to measure the electrolyte temperature, a second port to measure the atmospheric temperature above the electrolyte, a third port for adding the aluminum alloy and the fourth port was the exit port for monitoring the hydrogen gas generated.

The flask was lowered into a water bath which was supported over a magnetic stirrer. A magnetic stirring bar was placed into the flask and one liter of electrolyte added. All ports were sealed and tubing from the hydrogen exit port was connected to a bubbler at the bottom of an inverted burette filled with water. The water bath was preheated to 60° C. Equilibrium in the flask was achieved when the electrolyte and atmospheric temperature were held to within minus 1 degree and no gas bubbling was observed in the inverted burette. The barometric pressure was recorded and the test proceeded.

The burette reading was reset to zero. The aluminum alloy dimensions were measured, then rinsed with de-ionized water, cleaned with acetone and then weighed. The sample port opened and the sample added, the sample port was then closed. The hydrogen was read every minute, for 30 minutes. If the hydrogen evolution was rapid, the test was run for 30 minutes. If the hydrogen evolution was extremely slow, then the test was run for up to five hours with readings taken every 15 to 30 minutes after the initial one minute reading for the first 30 minutes. The temperature of the water in the burette was also monitored and recorded.

At the end of 30 minutes, the cell was opened and a clean aluminum alloy anode was lowered into the electrolyte along with a Hg/HgO reference cathode electrode. Connections were made to a voltmeter where the open circuit potential (OCP) was measured. As many as six different electrodes including using Hg/HgO reference electrodes, were placed into the electrolyte to assure accuracy of the measurements. All of the electrodes agreed to within plus or minus 5 millivolts. After the OCP measurements, a sample of the electrolyte was taken the aluminum alloy was removed and rinsed with de-ionized water and cleaned with acetone dried and reweighed. The timer was stopped as soon as the sample was removed. Corrosion rate was measured by the weight loss method using the following formula:

$$CR = (G \times 10,729.558 \times 1000/A)$$

wherein CR is the corrosion rate measured by the weight loss measured in ma/cm$^2$; G is grams of aluminum/second; and A is area measured in cm$^2$.

As a comparison, the corrosion rate was measured by hydrogen evolution using the following formula:

$$I(corr) \text{ by } H_2 = L \times \frac{Hg}{\frac{°K}{A}} \times 2352224.3 \times 1000 = ma/cm^2$$

wherein L is liters of hydrogen evolved per second; Hg is the constant mm Hg/760 mm; and A is area in cm$^2$.

Initial testing of the alloy was done with 6M NaOH electrolyte and 99.999 percent aluminum alloy.

Table 7 shows the results of the open circuit measurements of 6M NaOH basic solution.

The concentration of the gallium, indium, and concentrations were varied by two times and 20 times. At 1 mM (X2), the OCC increased from 25.9 to 88 ma/cm$^2$ while the OCP decreased from 1.844 to 1.776 volts.

The anode alloys were tested for open circuit corrosion and potential as a function of composition, concentration, heat treatment, and base metal purity. Along with testing at open circuit conditions the best of the alloys at open circuit were also tested under polarized conditions (200 ma/cm$^2$).

The OCC (Open Current Circuit) and the OCP (Open Current Potential) tests (See Tables 7 and 8) show the alloy has a very low rate and moderate OCP in comparison to the tested commercially available alloys.

Alloys of the invention polarize under an applied potential $-1.3$ V vs Hg/HgO at 200 ma/cm$^2$ (See Table 7). The preferred alloy was about 0.1 percent gallium, 0.1 percent indium, 0.1 percent lead in 99.99 percent aluminum.

TABLE 7

Alloys With 99.99 Percent Aluminum Base
Open Circuit Measurements
Base Solution = 6 M NaOH

| Alloy (All Weight %) | OCC Solution | (ma/cm$^2$) |
|---|---|---|
| 0.1 Ga, 0.1 In, 0.1 Pb | 0.5 mM Ga, In, Pb | 2.20 |
| 0.1 Ga, 0.1 Pb | 0.5 mM Ga, Pb | 7.59 |
| 0.1 Ga, 0.1 In, 0.1 Pb | 6 M NaOH | 7.70 |
| 0.2 Ga, 0.2 In, 0.2 Pb | 6 M NaOH | 10.40 |
| 0.2 Ga, 0.01 In, 0.01 Pb | 6 M NaOH | 14.60 |
| 0.2 Ga, 0.2 In, 0.2 Pb | 6 M NaOH | 15.90 |
| 0.2 Ga, 0.2 In, 0.2 Pb | 6 M NaOH | 16.00 |
| 0.1 Ga, 0.2 In, 0.01 Pb | 6 M NaOH | 17.10 |
| 0.2 Ga, 0.2 In, 0.01 Pb | 6 M NaOH | 17.70 |
| 0.1 Ga, 0.2 In, 0.01 Pb | 6 M NaOH | 18.10 |
| 0.1 Ga, 0.1 In, 0.1 Pb | 0.06 M Na$_2$SnO$_3$ | 18.20 |
| 0.01 Ga, 0.2 In, 0.2 Pb | 6 M NaOH | 18.30 |
| 0.2 Ga, 0.2 In, 0.2 Pb | 6 M NaOH | 18.60 |
| 0.2 Ga, 0.01 In, 0.2 Pb | 6 M NaOH | 18.90 |
| 0.2 Ga, 0.2 In, 0.01 Pb | 6 M NaOH | 21.20 |
| 0.2 Ga, 0.2 In, 0.2 Pb | 0.06 M Na$_2$SnO$_3$ | 21.20 |
| 0.1 Ga, 0.1 Pb, 0.1 Sn | 0.06 M Na$_2$SnO$_3$ | 21.80 |
| 0 1 Ga, 0.01 In, 0.01 Pb | 6 M NaOH | 22.20 |
| 0.01 Ga, 0.2 In, 0.01 Pb | 6 M NaOH | 23.50 |
| 0.2 Ga, 0.01 In, 0.01 Pb | 6 M NaOH | 23.70 |
| 0.1 Ga, 0.1 Pb | 0.06 M Na$_2$SnO$_3$ | 24.00 |
| 0.1 In, 0.1 Pb, 0.1 Sn | 0.5 mM In, Pb, Sn | 25.60 |
| 0.2 Ga, 0.01 In, 0.01 Pb | 6 M NaOH | 25.80 |
| 0.1 Ga, 0.1 In | 0.5 mM Ga, In | 26.20 |
| 0.2 Ga, 0.01 In, 0.2 Pb | 6 M NaOH | 31.30 |
| 0.2 Ga, 0.01 In, 0.22 Pb | 0.06 M Na$_2$SnO$_3$ | 31.70 |
| 0.01 Ga, 0.01 In, 0.01 Pb | 0.06 M Na$_2$SnO$_3$ | 35.00 |
| 0.2 Ga, 0.01 In, 0.2 Pb | 6 M NaOH | 35.30 |
| 0.2 Ga, 0.01 In, 0.01 Pb | 0.06 M Na$_2$SnO$_3$ | 37.10 |
| 0.01 Ga, 0.2 In, 0.2 Pb | 6 M NaOH | 38.70 |
| 0.1 Ga, 0.1 In | 6 M NaOH | 39.50 |
| 0.01 Ga, 0.2 In, 0.2 Pb | 6 M NaOH | 45.50 |
| 0.01 Ga, 0.01 In, 0.01 Pb | 6 M NaOH | 51.40 |
| 0.1 Ga, 0.1 In | 6 M NaOH | 51.70 |
| 0.01 Ga, 0.2 In, 0.2 Pb | 6 M NaOH | 52.80 |
| 0.1 Ga, 0.1 Pb, 0.1 Sn | 6 M NaOH | 55.90 |
| 0.2 Ga, 0.2 In, 0.01 Pb | 6 M NaOH | 58.40 |
| 0.01 Ga, 0.01 In, 0.2 Pb | 6 M NaOH | 63.80 |
| 0.1 In, 0.1 Pb | 0.5 mM In, Pb | 66.10 |
| 0.1 Ga, 0.1 In, 0.1 Pb, 0.1 Sn | 6 M NaOH | 70.30 |
| 0.01 Ga, 0.01 In, 0.01 Pb | 6 M NaOH | 74.00 |
| 0.1 In, 0.1 Pb | 6 M NaOH | 75.40 |
| 0.1 Ga, 0.1 Pb, 0.1 Sn | 6 M NaOH | 77.30 |
| 0.1 In, 0.1 Pb | 6 M NaOH | 81.00 |
| 0.01 Ga, 0.01 In, 0.01 Pb | 6 M NaOH | 81.50 |
| 0.01 Ga, 0.01 In, 0.2 Pb | 6 M NaOH | 136.70 |
| 0.1 In, 0.1 Pb, 0.1 Sn | 6 M NaOH | 138.70 |
| 0.1 In, 0.1 Pb, 0.1 Sn | 6 M NaOH | 138.90 |
| 0.1 Ga, 0.1 Pb | 6 M NaOH | 146.30 |
| 0.1 Ga, 0.1 Pb, 0.1 Sn | 0.5 mM Ga, Pb, Sn | 163.10 |
| 0.01 Ga, 0.01 In, 0.2 Pb | 6 M NaOH | 172.90 |
| 0.01 Ga, 0.01 In, 0.2 Pb | 6 M NaOH | 190.50 |

TABLE 8

| Alloy (All Weight %) | Alloys In Caustic Solutions Polarized At 200 ma/cm$^2$ | | |
|---|---|---|---|
| | Cell Solution | OCP (Volts) | (Volts) |
| 0.1 Ga—0.1 In—0.1 Pb | 6 M NaOH + .06 M Na$_2$SnO$_3$ | 1.382 | 1.815 |
| 99.999% Aluminum | 6 M NaOH + .06 M Na$_2$SnO$_3$ | 1.243 | 1.889 |
| 99.999% Aluminum | 6 M NaOH + .06 M Na$_2$SnO$_3$ | 1.424 | 1.889 |
| 0.1 Ga—0.1 In—0.1 Pb | 6 M NaOH + 0.05 mM Ga—In—Pb | 1.296 | 1.667 |
| 99.999% Aluminum | 6 M NaOH + 0.5 mM Ga—In—Pb | 1.451 | 1.736 |
| 99.999% Aluminum | 6 M NaOH | 1.473 | 1.759 |
| 99.999% Aluminum | 6 M NaOH | 1.306 | 1.759 |

The OCC numbers of Tables 7 and 8 are a measure of the open circuit corrosion of the aluminum alloy in 6M NaOH at 60° C. The lower numbers show minimal corrosion and a superior alloy.

It will be appreciated that it is desirable for an aluminum alloy to have high open circuit voltage and high coulombic efficiency for certain applications. An aluminum anode alloy comprising at least about 0.01 to 0.2 percent gallium, at least about 0.01 to 0.2 percent tin, and at least about 0.01 to 0.2 percent lead achieves these desired characteristics. This alloy may preferably be used as an anode and preferably used with a salt water electrolyte. Alternatively, at least about 0.01 to 0.2 percent indium may be used in lieu of the tin in the alloy. This alloy may be preferably used as an anode and more preferably with a caustic electrolyte.

Whereas particular embodiments of the invention have been described above for purposes of illustration, it will be appreciated by those skilled in the art that numerous variations of the details may be made without departing from the invention as described in the appended claims.

We claim:

1. An aluminum base alloy consisting essentially of:
   aluminum;
   about 0.01 to 0.2 percent gallium;
   about 0.01 to 0.2 percent tin;
   about 0.01 to 0.2 percent lead; and
   the balance aluminum.

2. The alloy of claim 1, wherein the purity of said aluminum is at least about 99.9 percent.

3. The alloy of claim 2, wherein gallium is present in an amount of at least about 0.1 percent; tin is present in an amount of at least about 0.1 percent; and lead is present in an amount of at least about 0.1 percent.

4. An aluminum base alloy consisting essentially of:
   aluminum;
   about 0.01 to 0.2 percent gallium;
   about 0.01 to 0.2 percent indium;
   about 0.01 to 0.2 percent lead;
   the balance aluminum; and
   said alloy characterized by high voltage and corrosion resistance properties.

5. The alloy of claim 4, wherein the purity of said aluminum is at least about 99.9 percent.

6. The alloy of claim 4, wherein gallium is present in an amount of at least about 0.1 percent; indium is present in an amount of at least about 0.1 percent; and lead is present in an amount of at least about 0.1 percent.

7. The aluminum base alloy anode consisting essentially of:
   aluminum
   about 0.01 to 0.2 percent gallium;
   about 0.01 to 0.2 percent tin;
   about 0.01 to 0.2 percent lead; and
   the balance aluminum.

8. The anode of claim 7, wherein the purity of said aluminum is at least about 99.9 percent.

9. The anode of claim 8, wherein gallium is present in an amount of at least about 0.1 percent; tin is present in an amount of at least about 0.1 percent; and lead is present in an amount of at least about 0.1 percent.

10. A battery assembly comprising:
    a housing;
    an anode disposed within said housing;
    a cathode disposed within said housing;
    support means disposed within said housing for supporting said anode and said cathode in a relative spaced relationship;
    said anode consisting essentially of at least about 0.01 to 0.2 percent gallium;
    at least about 0.01 to 0.2 percent indium;
    at least about 0.01 to 0.2 percent lead;
    the balance being aluminum; and
    said anode characterized by high voltage and low corrosion characteristics when employed with a caustic electrolyte.

11. The battery of claim 10, wherein the purity of said aluminum is at least 99.9 percent.

12. The battery of claim 11, wherein gallium is present in an amount of at least about 0.1 percent; indium is present in an amount of at least about 0.1 percent; and lead is present in an amount of at least about 0.1 percent.

13. A battery assembly comprising:
    a housing;
    an anode;
    a cathode;
    support means disposed within said housing for supporting said anode and said cathode in a relative spaced relationship;
    said anode consisting essentially of at least about 0.01 to 0.2 percent gallium;
    at least about 0.01 to 0.2 percent tin;
    at least about 0.01 to 0.2 percent lead;
    the balance being aluminum; and
    said anode characterized by high voltage and low corrosion properties.

14. The battery of claim 13, wherein the purity of said aluminum is at least 99.9 percent.

15. The battery of claim 14, wherein gallium is present in an amount of at least about 0.1 percent; tin is present in an amount of at least about 0.1 percent; and lead is present in an amount of at least about 0.1 percent.

* * * * *

UNITED STATES PATENT AND TRADEMARK OFFICE
CERTIFICATE OF CORRECTION

PATENT NO. : 4,808,498

DATED : February 28, 1989

INVENTOR(S) : GARY P. TARCY and ROBERT M. MAZGAJ

It is certified that error appears in the above-identified patent and that said Letters Patent is hereby corrected as shown below:

Column 1, line 52, "another" should be --an--.

Column 2, line 58, "2 percent" should be --0.2 percent--.

Column 2, line 64, "2 percent" should be --0.2 percent--.

Column 6, line 27, "behaviour" should be --behavior--.

Column 8, line 7, --corrosion-- should be inserted between "low" and "rate".

In TABLE 7, column 8, line 38, "0 1" should be --0.1--.

Signed and Sealed this

Third Day of October, 1989

Attest:

DONALD J. QUIGG

*Attesting Officer*  *Commissioner of Patents and Trademarks*